United States Patent
Keller

(10) Patent No.: US 6,911,632 B2
(45) Date of Patent: Jun. 28, 2005

(54) METHOD FOR CONTROLLING THE POSITION OF A FOIL STRIP EDGES

(75) Inventor: Gerhard Keller, Jongny (CH)

(73) Assignee: Aisapack Holding SA, Vouvry (CH)

( * ) Notice: Subject to any disclaimer, the term of this patent is extended or adjusted under 35 U.S.C. 154(b) by 0 days.

(21) Appl. No.: 10/489,226

(22) PCT Filed: Sep. 9, 2002

(86) PCT No.: PCT/EP02/10089

§ 371 (c)(1),
(2), (4) Date: Mar. 9, 2004

(87) PCT Pub. No.: WO03/024694

PCT Pub. Date: Mar. 27, 2003

(65) Prior Publication Data

US 2004/0238529 A1 Dec. 2, 2004

(30) Foreign Application Priority Data

Sep. 12, 2001 (DE) .......................................... 101 44 898

(51) Int. Cl.[7] .............................. H05B 6/06; B29C 53/54
(52) U.S. Cl. ........................ 219/614; 219/617; 219/608; 219/650; 219/61.3; 219/61.5; 228/103; 228/141.1
(58) Field of Search ................................. 219/603–617, 219/650–653, 60.2–67; 228/141.1–145, 103

(56) References Cited

U.S. PATENT DOCUMENTS

3,573,416 A * 4/1971 Drechsler .................... 219/608
3,824,366 A   7/1974 Garnier

FOREIGN PATENT DOCUMENTS

| DE | 3739400     | 1/1989  |              |
|----|-------------|---------|--------------|
| DE | C2 37 39 400| 1/1989  |              |
| EP | 0899085     | 3/1999  |              |
| EP | 1116659     | 7/2001  |              |
| GB | 1496377     | 12/1977 |              |
| GB | 1567696     | 5/1980  |              |
| JP | 56-14093  * | 2/1981  | .... 219/61.5|
| JP | 4-274887  * | 9/1992  | .... 219/61.2|
| JP | 05250944    | 9/1993  |              |

* cited by examiner

Primary Examiner—Philip H. Leung
(74) Attorney, Agent, or Firm—Collard & Roe, P.C.

(57) ABSTRACT

A method for controlling the edges (7, 7') of a foil strip guided in a shaping funnel of a device producing tubular bodies from the foil strip by an overlapping weld seam using a guide wedge, the strip being then welded. According to the invention, after welding, the method consists in using a linear infrared sensor for measuring and evaluating a temperature profile perpendicular to the overlapping weld seam. In case of variation relative to the specific real profile, a signal is automatically transmitted to rotate the shaping funnel with the guide wedge, the welding being produced by the high frequency (HF) and the temperature profile being measured directly after welding.

3 Claims, 5 Drawing Sheets

SECTION A-A

SECTION B-B

METHOD FOR CONTROLLING THE POSITION OF A FOIL STRIP EDGES

CROSS REFERENCE TO RELATED APPLICATIONS

Applicant claims priority under 35 U.S.C. §119 of German Application No. 101 44898.8 filed on Sep. 12, 2001. Applicant also claims priority under 35 U.S.C. §365 of PCT/EPO2/10089 filed on Sep. 9, 2002. The international application under PCT article 21(2) was not published in English.

The invention relates to a method for controlling the edges of a foil strip guided in a shaping funnel of a device producing tubular bodies from the foil strip by an overlapping weld seam using a guide wedge, said strip being then welded.

At first, the flatly positioned foil strip is shaped in a shaping funnel to form a continuous pipe, wherein a guide wedge guides the respective foil edges one above the other to the tubular position to produce an overlapping weld seam. Being exposed to heat and, if necessary, pressure as well, the lateral edges that are overlapping each other are welded to form a firm pipe, are then cut to length and supplied to a further processing unit. Laminates comprising a central diffusion-inhibiting interlining between two external plastic layers and, if the need arises, additional plastic layers arranged therebetween and, if necessary, connected by means of bonding layers, are used as foil strips, wherein the interlining may, for example, be designed as aluminium foil. The layer thickness of such aluminium foils ranges from 0.01 to 0.04 mm and greater, if necessary. For welding, inductive heat is generated in the aluminium layer, e.g. by high frequency by means of an HF inductor. The usual overlapping of the lateral edges of the laminate is approx. 2 to 4 mm and, in exceptional cases, even less or greater.

Such a device is known from DE-C2-37 39 400. Instead of or in addition to the shaping funnel, the tubular form can also be achieved by external and, if necessary, internal drive strips, wherein it is also possible to use an inductor coil.

To concentrate the field lines, a ferrite core can also be provided in the bobbin to permit spatial limitation and intense transfer of the inductive heat. Usually, with the help of the central aluminium foil, the plastic layers enclosing the central aluminium foil are heated beyond their melting point, bonded to each other, compressed under pressure if necessary to form a seam if necessary and shaped if necessary and are then cooled, for example by external and, if necessary, internal cooling rollers, which can also be used for compression to form a permanent and shaped weld seam. Usually, laminate foil strips, for example for the manufacture of laminate tubes, approx. 1.2 meters in width, are made on what is called laminators and are then wound by a winding machine to form source reels. Depending on the desired diameters of the tubular bodies of the laminate tubes, a strip cutting machine is used to produce from these source reels several single reels having a width that corresponds to the desired diameter of the tubes. This results in several parallel single reels over the width of the source reel, each single reel having different properties. Particularly with regard to the distribution of stress, there are—in part considerable—differences in each single reel that lead to instabilities in tube formation and/or in the welding unit. It can be observed that the overlapping region of the foil strips is laterally moving to and fro or even makes what is called drifting or deflecting movements. All this—in particular the lateral drift—leads to wide variations in the transfer of energy into the overlapping regions; as a result, it is extremely difficult to keep a stable overlapping weld seam, this requiring active monitoring on the part of the operating personnel and frequent readjustment of the shaping funnel by means of the centering wedge, if rejects are to be prevented.

Owing to the foil thickness of the foil strips that is often very thin, the edges of the foil strips themselves are already so unstable that it is not possible to use mechanical sensing means. Fluid sensing means using a very fine air jet that is directed onto the overlapping edge so that changes in the distance from the air nozzle to the object manifest themselves in pressure changes in the nozzle that can be used to control the foil infeed have also shown to be problematic.

Since the high-frequency alternating field developing in the welding process is usually relatively strong, it is not possible to use electrical sensors for inductive or capacitive measurement methods. Because there is a wide range of colors of the foils to be processed and/or, if necessary, of various print images as well, the use of optical scanning means, such as CCD cameras, is also often difficult.

The invention aims at specifying a method for controlling the position of the edges of a foil strip, wherein there is a method that permits automatic control by monitoring the position of the overlapping seam weld without any sensing or scanning means, so that monitoring and manual control by personnel is not necessary in order to prevent rejects.

The invention is illustrated in more detail below, by means of an executive example and with reference to drawings.

Figure 1:
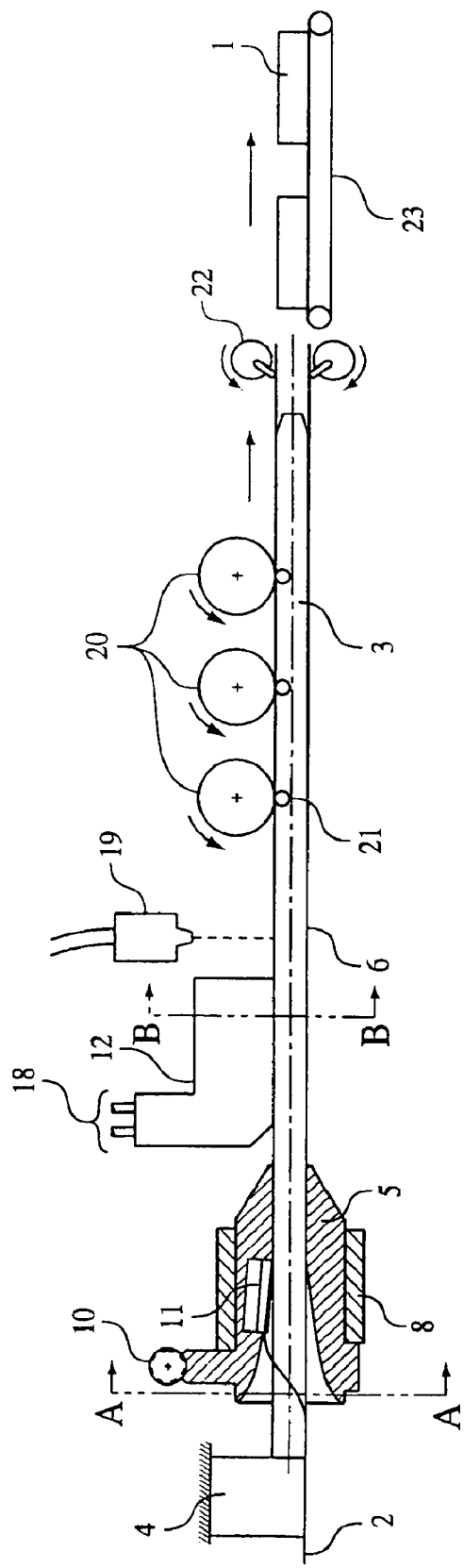
FIG. 1 is a schematic view of an apparatus for producing tubular body sections from a foil strip.

The apparatus for producing tubular body sections 1 shown in FIG. 1 comprises a single reel (not illustrated) with a strip-shaped foil, for example a laminate foil 2 that contains at least one interlining, for example made of aluminium, that is enclosed by two external plastic layers. The flatly supplied laminate foil 2 is formed around a welding mandrel 3 still arranged in the region of the flat laminate foil 2 and mounted in a suspension unit 4, to produce a continuous tube 6 with overlapping edges 7, 7' by means of a shaping funnel 5.

The shaping funnel 5 is rotatably arranged in a holder that is designed as a bushing 8. Via a worm gear 10 comprising a worm wheel 10' and a worm 10", a motor 9 is in connection with the shaping funnel 5 to rotate the latter about its central axis. A guide wedge 11 through which the two edges 7, 7' of the supplied laminate foil 2 are guided to a position where they are overlapping each other is permanently arranged inside the shaping funnel 5. The overlapping region of the edges 7, 7' of the foil strip 2 is approx. 2 to 5 mm. In special cases, this overlapping can also be greater or less, but it must be great enough, according to the desired diameter of the formed continuous tube 6, to ensure that an appropriately firm overlapping weld seam 13 can be produced in the following welding unit 12.

Figure 5:
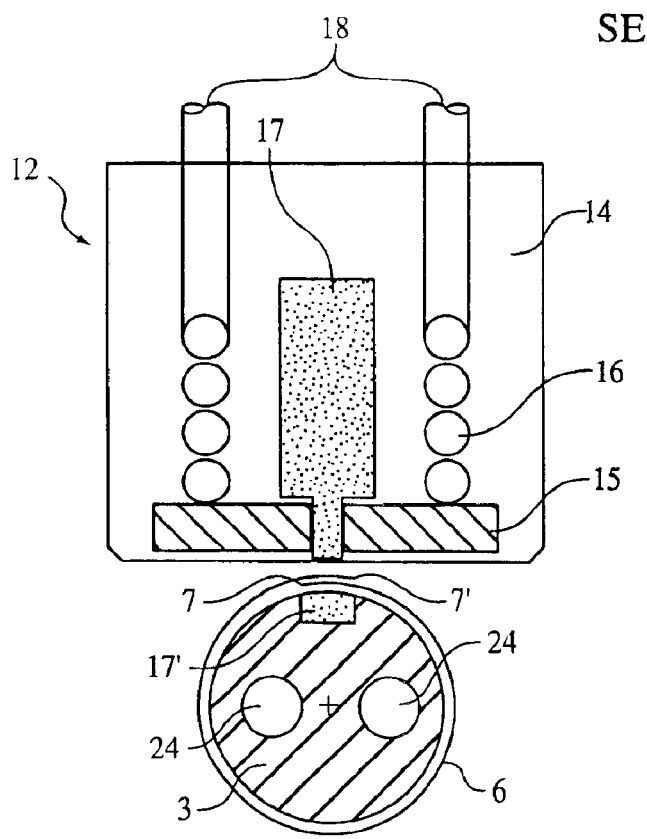
FIG. 5 is a partial sectional view through the welding unit, taken along lines B—B of FIG. 1.
Figure 6:
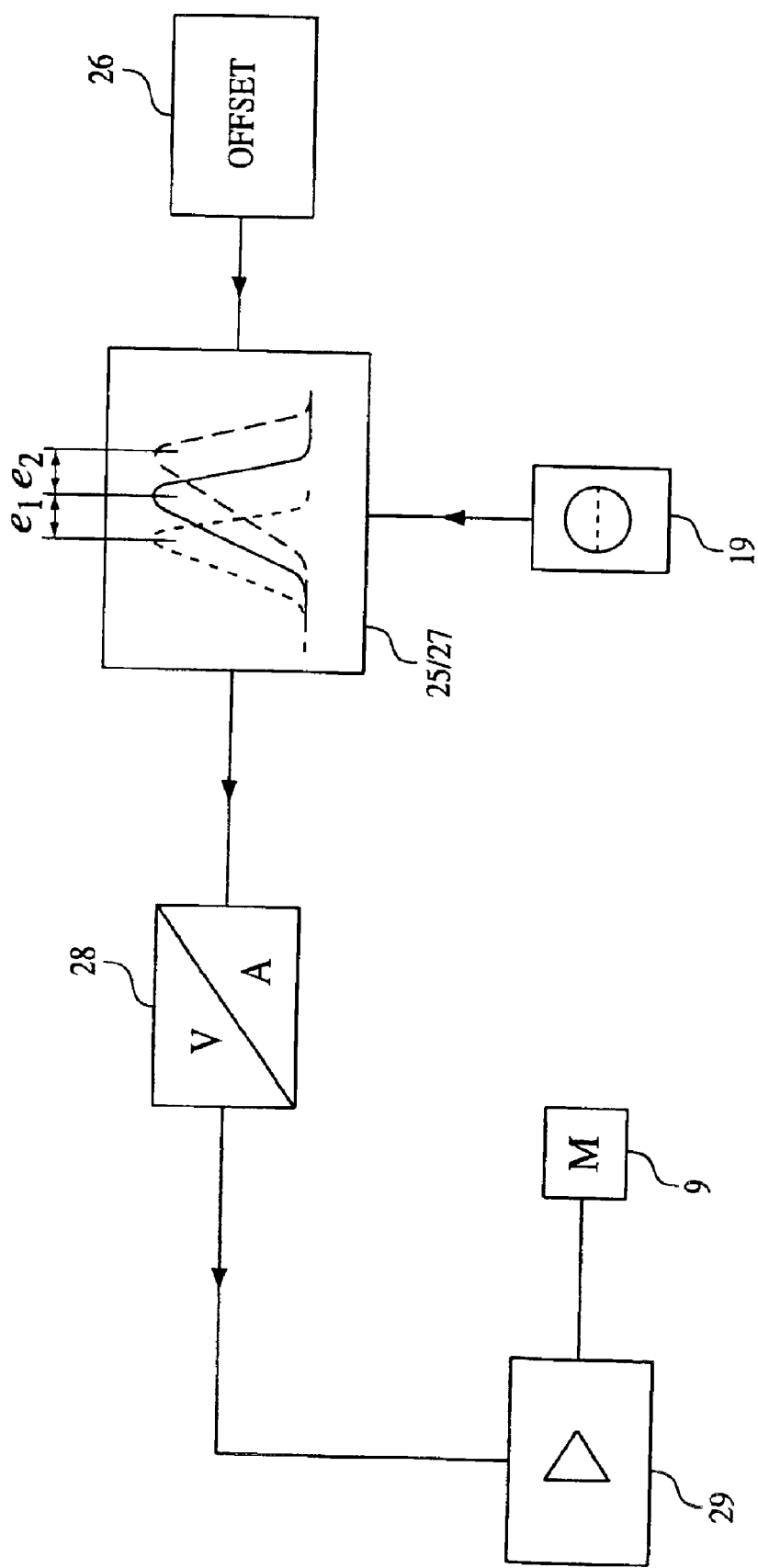
FIG. 6 is a schematic circuit diagram of the connection of an image of an actual overlapping weld seam temperature scanned by the linear IR sensor to an evaluation unit and a control unit for rotating the shaping funnel.

In the executive example, the welding unit 12 schematically shown in FIG. 5 comprises a high-frequency (HF) welding device with a housing 14 in which a bobbin 15, if necessary with additional coil windings 16, is arranged to the side of the welding mandrel 3. A ferrite core 17 is arranged in the bobbin 15, if necessary in the additional coil windings 16 as well.

Figure 2:
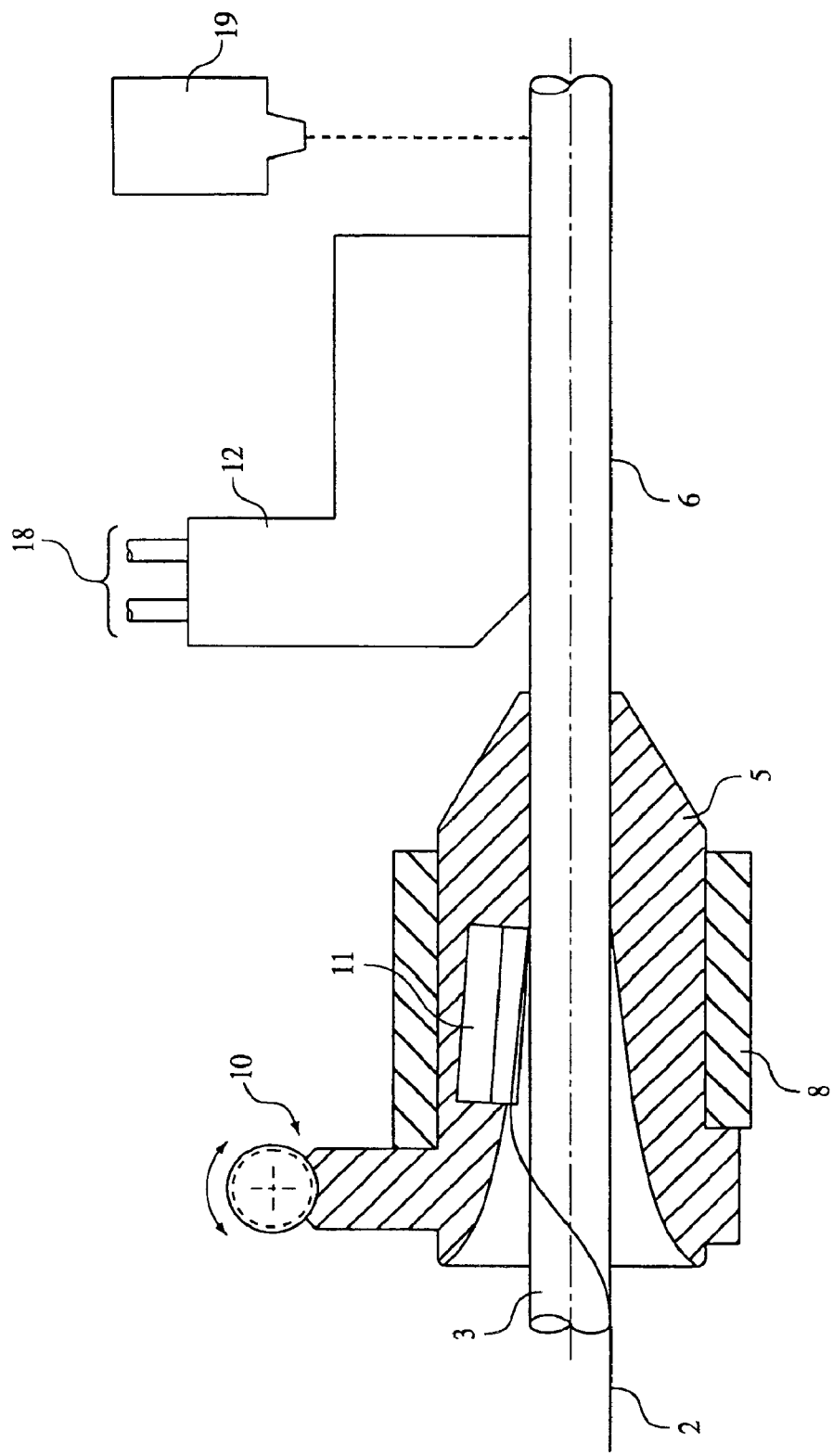
FIG. 2 is an enlarged detail of the apparatus with a foil funnel, a welding unit and a linear sensor.
Figure 3:
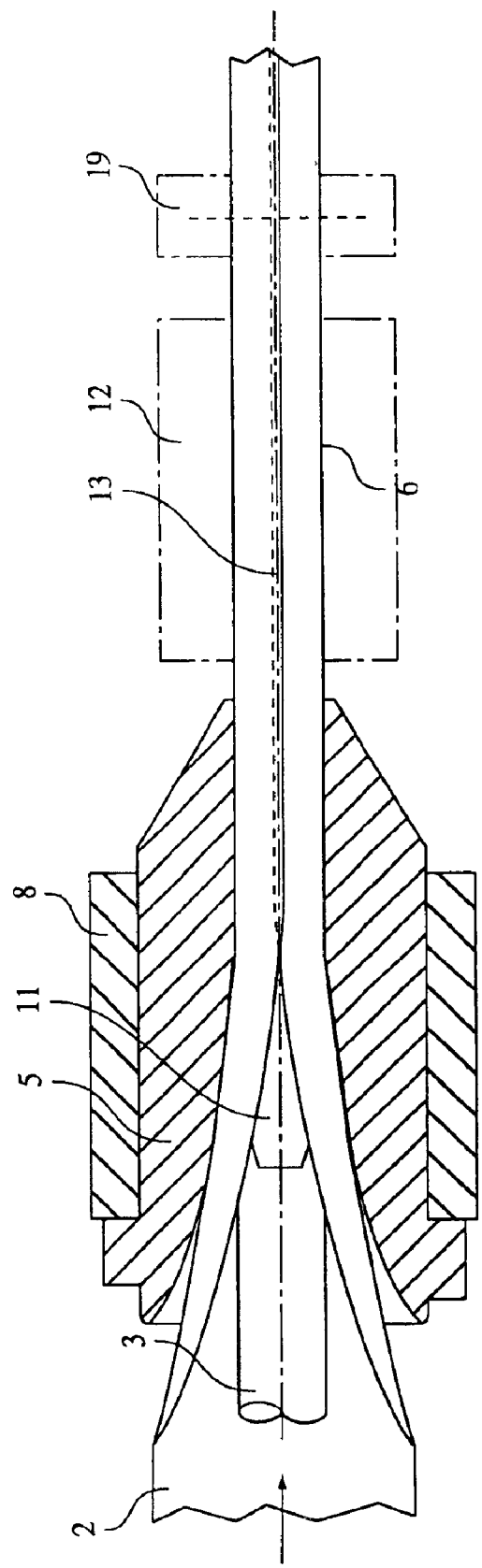
FIG. 3 is the same view as in FIG. 2, however, from above (i.e. turned by 90 degrees as compared with FIG. 2)
Figure 4:
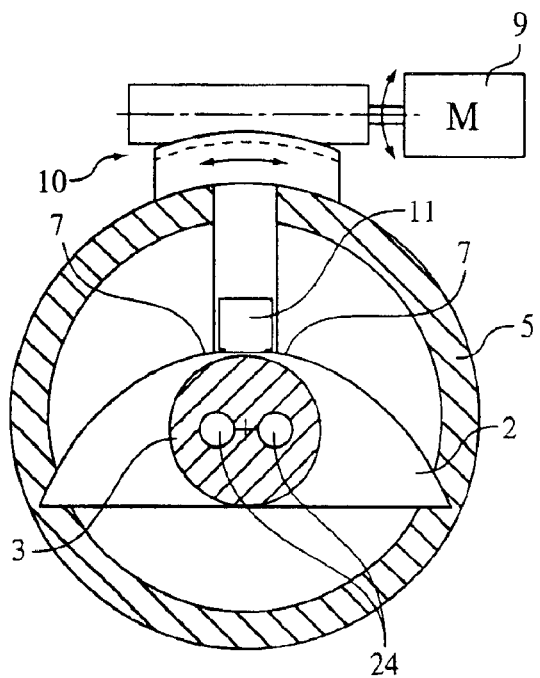
FIG. 4 is a top view in axial direction of the infeed of the shaping funnel with a partial sectional view taken along lines A—A of FIG. 1.

Electric lines 18 used to supply the welding unit 12 with operating current are indicated in FIGS. 1, 2 and 5.

In the upper rounding of the welding mandrel 3, an additional ferrite core 17' is inserted opposite to the ferrite core 17 of the welding coil. With the help of the aluminium layers in the edges 7, 7' that are overlapping each other, the ferrite cores 17, 17' that are arranged opposite to each other permit melting of a region of the respective plastic layers of the laminate foil 2 that is restricted within tight limits and is, in essence, covering only the actual overlapping weld seam 13.

An electric infrared linear sensor 19 taking an image of the temperature course within the melted region of the overlapping weld seam 13 perpendicular to the longitudinal extension of the continuous tube 6 is arranged immediately after the welding unit 12. The IR linear sensor is followed by a roller 20 to each of which a mating roller 21 can be assigned in the welding mandrel 3, with the rollers being used as cooling and/or compressing or forming rollers. It is also possible to provide further rollers 20 and mating rollers 21 that can be used to form the overlapping weld seam 13 and, at the same time, to additionally cool same if necessary. The number of rollers 20 and, if necessary, of mating rollers 21 can be varied as desired and adjusted to the particular forming and cooling conditions.

The continuous tube 6 that is then unwinding from the welding mandrel 3 with a firm overlapping weld seam is supplied to a cutting device 22 or length-trimming apparatus. The executive example provides a known cross cutter that can be used to separate the tubular body sections 1 thus produced at the desired length, which can then be supplied to a further processing unit (not illustrated) by means of a conveyor belt 23, for example for mounting a tube shoulder with closing cap.

The welding mandrel 3 may also comprise holes 24 through which a cooling agent, for example water, can be supplied.

The temperature profile of the practically still melted overlapping weld seam 13 that has been determined by the infrared linear sensor 19 is supplied to an evaluation unit 25. The setpoint input device 26 is used to enter a rated temperature profile depending on the desired product. At specific time intervals, for example every two seconds, the actual profile determined by the IR linear sensor 19 is compared with the specified rated profile by means of an IR analyzer 27, and the particular deviations, for example $e_1$ or $e_2$, are determined. A signal converter 28 converts the signals corresponding to the particular deviation value, for example $e_1$ or $e_2$, into a signal suitable for the motor 9, wherein the signal can also be amplified by an amplifier 29. Because of the signal, the motor 9, by means of the worm gear 10, rotates the shaping funnel 5 and, thus, also the guide wedge 11 connected thereto in one direction until the deviation $e_1$ or $e_2$ is compensated or equalized and the rated profile is congruent with the actual profile measured by the IR linear sensor 19.

This maneuver modifies the infeed of the strip of the laminate foil 2 and thus the overlapping of the foil edges 7, 7' of the particular laminate foil 2 such that any deviations along the cross-section or the length of each single reel of a laminate foil 2 are automatically compensated within the shortest possible time—practically at once. Defective overlapping weld seams 13 and thus rejects are hence prevented reliably and as quickly as possible.

What is claimed is:

1. Method for controlling the position of the edges (7, 7') of a foil strip guided in a shaping funnel (5) of a device producing tubular bodies from the foil strip by an overlapping weld seam (13) using a guide wedge (11), said strip being then welded, wherein measuring and evaluating a temperature profile perpendicular to the overlapping weld seam (13) with an infrared linear sensor (19) after welding, emitting a signal representing any deviations from the specified actual profile and rotating the shaping funnel (5) by means of the guide wedge (11) in response to the signal.

2. Method according to claim 1, wherein high-frequency (HF) welding is used as welding process.

3. Method according to claim 1, wherein the temperature profile is measured immediately after welding.

* * * * *